US012602012B2

(12) United States Patent
Gao

(10) Patent No.: US 12,602,012 B2
(45) Date of Patent: Apr. 14, 2026

(54) WATCH

(71) Applicant: VIVO MOBILE COMMUNICATION CO., LTD., Dongguan (CN)

(72) Inventor: Hanfei Gao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 197 days.

(21) Appl. No.: 18/223,024

(22) Filed: Jul. 17, 2023

(65) Prior Publication Data

US 2023/0359150 A1 Nov. 9, 2023

Related U.S. Application Data

(63) Continuation of application No. PCT/CN2022/072782, filed on Jan. 19, 2022.

(30) Foreign Application Priority Data

Jan. 20, 2021 (CN) ........................ 202110078340.6

(51) Int. Cl.
*G04B 37/18* (2006.01)
*G04B 37/14* (2006.01)

(52) U.S. Cl.
CPC ......... *G04B 37/1486* (2013.01); *G04B 37/18* (2013.01)

(58) Field of Classification Search
CPC ............................ G04B 37/18; G04B 37/1486
USPC .......................................................... 224/164
See application file for complete search history.

(56) References Cited

U.S. PATENT DOCUMENTS

| | | | | |
|---|---|---|---|---|
| 9,204,710 | B1 * | 12/2015 | Burns | G06F 1/163 |
| 9,869,976 | B2 * | 1/2018 | Perko | G04B 37/1486 |
| 2005/0235464 | A1 * | 10/2005 | Sima | A44C 5/14 24/265 WS |
| 2006/0133213 | A1 * | 6/2006 | Robert | G04G 21/02 368/88 |
| 2008/0112270 | A1 * | 5/2008 | Yeh | G04G 17/00 368/291 |

(Continued)

FOREIGN PATENT DOCUMENTS

| | | |
|---|---|---|
| CN | 2003329782 A | 11/2003 |
| CN | 207870446 U | 9/2018 |

(Continued)

OTHER PUBLICATIONS

International Search Report issued in corresponding International Application No. PCT/CN2022/072782, mailed Apr. 20, 2022, 6 pages.

(Continued)

*Primary Examiner* — Peter N Helvey
(74) *Attorney, Agent, or Firm* — IPX PLLC

(57) ABSTRACT

Disclosed is a watch, including a main body and a watch strap. The main body includes a middle frame and a decorative ring; the middle frame is provided with a sliding groove; an outer wall of the middle frame is provided with a watch strap insertion opening that is communicated with the sliding groove; the decorative ring is rotatably connected to the middle frame; the decorative ring is provided with a latch portion; the latch portion extends into the sliding groove; an end of the watch strap is provided with a latch engagement portion; at least the latch engagement portion can be inserted into the sliding groove through the watch strap insertion opening; and the decorative ring has a first location and a second location relative to the middle frame.

10 Claims, 6 Drawing Sheets

(56) References Cited

U.S. PATENT DOCUMENTS

| | | | | |
|---|---|---|---|---|
| 2012/0051193 | A1 * | 3/2012 | Yu | G04C 10/00 361/679.01 |
| 2012/0176871 | A1 * | 7/2012 | Ueno | G04B 37/052 368/287 |
| 2012/0257482 | A1 * | 10/2012 | Raffy | A44C 5/147 368/277 |
| 2013/0088942 | A1 * | 4/2013 | Perko | G04B 37/1486 368/278 |
| 2016/0037876 | A1 | 2/2016 | Perkins et al. | |

FOREIGN PATENT DOCUMENTS

| | | | |
|---|---|---|---|
| CN | 208126117 | U | 11/2018 |
| CN | 110051091 | A | 7/2019 |
| CN | 209376869 | U | 9/2019 |
| CN | 110780578 | A | 2/2020 |
| CN | 210348216 | U | 4/2020 |
| CN | 210402031 | U | 4/2020 |
| CN | 210864341 | U | 6/2020 |
| CN | 111528586 | A | 8/2020 |
| CN | 112806678 | A | 5/2021 |
| EP | 3070546 | A1 | 9/2016 |
| EP | 3206092 | A1 | 8/2017 |

OTHER PUBLICATIONS

First Office Action issued in related Chinese Application No. 202110078340.6, mailed Jan. 26, 2022, 9 pages.

Second Office Action issued in related Chinese Application No. 202110078340.6, mailed Oct. 28, 2022, 6 pages.

* cited by examiner

WATCH

CROSS-REFERENCE TO RELATED APPLICATIONS

This application is a continuation of International Application No. PCT/CN2022/072782, filed Jan. 19, 2022, which claims priority to Chinese Patent Application No. 202110078340.6, filed Jan. 20, 2021. The entire contents of each of the above-referenced applications are expressly incorporated herein by reference.

TECHNICAL FIELD

This application relates to the technical field of electronic devices, and in particular, to a watch.

BACKGROUND

Smart wearable devices play an increasingly important role in people's life. Smart watches are widely welcomed by people because they have more functions than traditional watches. As one of the most important structures of smart watches, a watch strap produces not only a fixing effect, but also a good decorative effect. Therefore, demounting of the watch strap is an important factor affecting user experience.

Currently, a watch strap of a watch is mainly connected with a watch body through spring bars. A watch of this type has a problem that it is inconvenient to demount a watch strap. Spring bars are classified into spring bars having shifting levers and spring bars without shifting levers. When demounting a watch strap of a watch that uses spring bars without shifting levers, a user needs to use a specialized tool for demounting. As a result, the demounting is inconvenient. When demounting a watch strap of a watch that uses spring bars having shifting levers, a user needs to eject the shifting levers with a finger for demounting the spring bars. However, the shifting levers are small in size. As a result, during an actual demounting process, the shifting levers are propped against the finger of the user, making the user feel pain and leading to poor watch strap demounting experience.

SUMMARY

An embodiment of this application provides a watch, including a main body and a watch strap, where the main body includes a middle frame and a decorative ring, the middle frame is provided with a sliding groove, an outer wall of the middle frame is provided with a watch strap insertion opening that is communicated with the sliding groove, the decorative ring is rotatably connected to the middle frame, the decorative ring is provided with a latch portion, and the latch portion extends into the sliding groove;

- an end of the watch strap is provided with a latch engagement portion, and at least the latch engagement portion can be inserted into the sliding groove through the watch strap insertion opening; and
- the decorative ring has a first location and a second location relative to the middle frame, where in a case that the decorative ring is at the first location, the latch portion is plugged in the latch engagement portion, and the watch strap is connected with the main body, or in a case that the decorative ring is at the second location, the latch portion is separated from the latch engagement portion, and the watch strap can be separated from the main body.

BRIEF DESCRIPTION OF DRAWINGS

The accompanying drawings described herein are intended to provide further understanding of this application, and constitute a part of this application. Example embodiments of this application and descriptions thereof are intended to describe this application, but do not constitute inappropriate limitations to this application. In the accompanying drawings.

DETAILED DESCRIPTION

To make the objectives, technical solutions, and advantages of this application clearer, the following describes the technical solutions of this application with reference to the specific embodiments of this application and the corresponding accompanying drawings. Apparently, the described embodiments are merely some rather than all of embodiments of this application. All other embodiments obtained by those of ordinary skill in the art based on the embodiments of this application without creative efforts should fall within the protection scope of this application.

The terms "first", "second", and the like in the description and the claims of this application are used to distinguish between similar objects instead of describing a specific order or sequence. It should be understood that data used in this way may be interchangeable in appropriate cases, so that the embodiments of this application can be implemented in a sequence other than those shown or described herein. In addition, in the specifications and the claims, "and/or" represents at least one of connected objects, and a character "/" generally represents an "or" relationship between associated objects.

The technical solutions disclosed in embodiments of this application are described in detail below with reference to the accompanying drawings.

Figure 1:
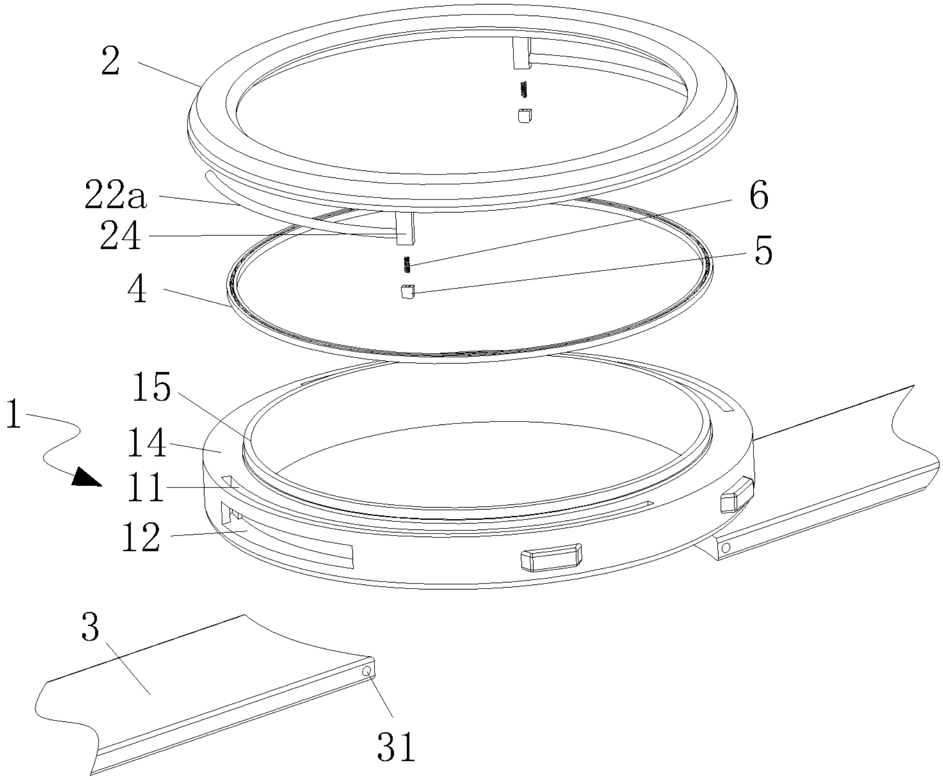
FIG. 1 is a schematic diagram of a first exploded structure of a watch according to an embodiment of this application.

As shown in FIG. 1, an embodiment of this application provides a watch, including a main body and a watch strap 3. The main body includes a middle frame 1 and a decorative ring 2. The middle frame 1 is provided with a sliding groove 11. An outer wall of the middle frame 1 is provided with a watch strap insertion opening 12 that is communicated with the sliding groove 11. The decorative ring 2 is rotatably connected to the middle frame 1 through a bearing 4. The decorative ring 2 is provided with a latch portion. The latch portion extends into the sliding groove 11. An end of the watch strap 3 is provided with a latch engagement portion. At least the latch engagement portion can be inserted into the sliding groove 11 through the watch strap insertion opening 12. The decorative ring 2 has a first location and a second location relative to the middle frame 1. In a case that the decorative ring 2 is at the first location, the latch portion is plugged in the latch engagement portion, and the watch strap 3 is connected with the main body. In a case that the decorative ring 2 is at the second location, the latch portion is separated from the latch engagement portion, and the watch strap 3 can be separated from the main body, that is, the watch strap 3 can be removed.

Figure 2:
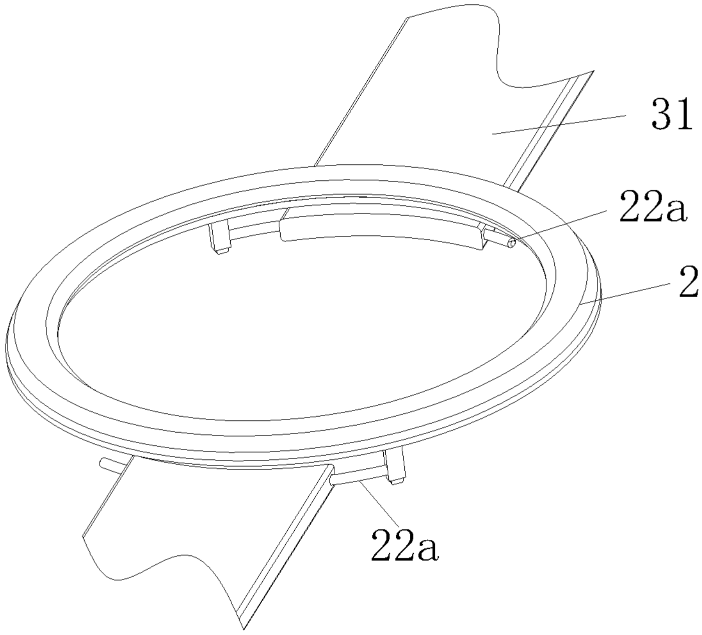
FIG. 2 is a schematic diagram of a structure in which an arc-shaped plug-in shaft in FIG. 1 is inserted into a through groove in a watch strap.

As shown in FIG. 2, to mount a watch strap 3, a user first inserts the end of the watch strap 3 into the sliding groove 11 through the watch strap insertion opening 12, and then rotates the decorative ring 2 to the first location. At this moment, the latch portion is plugged in the latch engagement portion on the watch strap 3, so that the watch strap 3 is connected to the middle frame 1. To demount the watch strap 3, the user rotates the decorative ring 2 in a reverse direction until the decorative ring reaches the second location, to withdraw the latch portion from the latch engagement portion gradually, so that the latch portion is completely separated from the latch engagement portion. At this moment, the watch strap 3 can be taken out.

Figure 3:
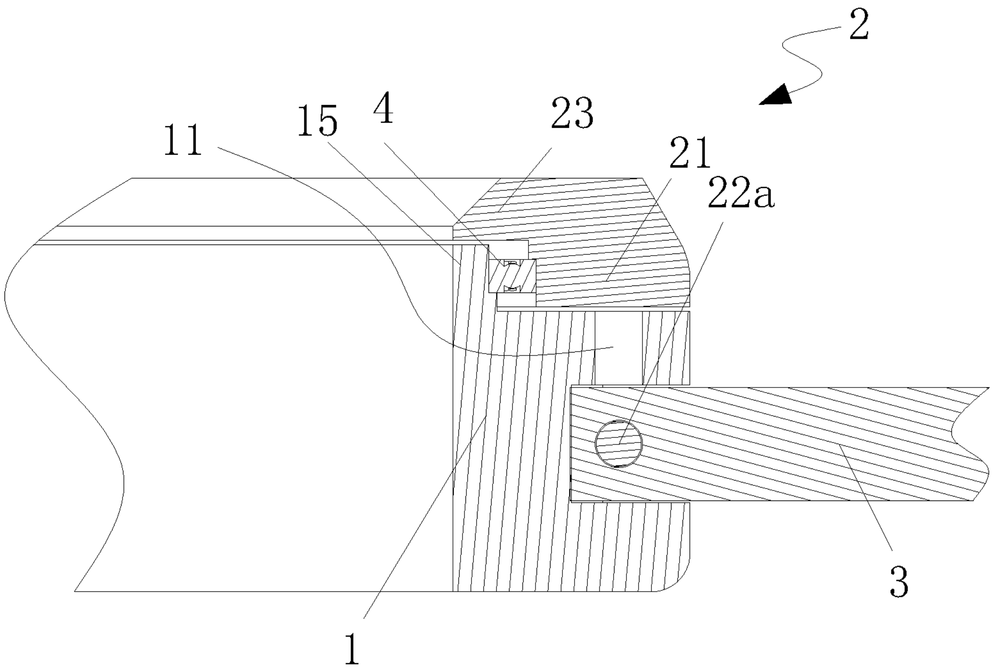
FIG. 3 is a longitudinally sectional view of a location of the watch in FIG. 1.

As shown in FIG. 3, a top of the middle frame 1 is provided with an opening portion. An edge of the opening portion has a circular end surface 14. The sliding groove 11 is formed in the circular end surface 14. The sliding groove 11 extends into the middle frame 1 by a specific depth. A circular convex rib 15 is disposed on a side, away from the watch strap insertion opening 12, of the circular end surface 14. The decorative ring 2 is connected with the circular convex rib 15 through the bearing 4. The decorative ring 2 covers the sliding groove 11.

In this implementation, the decorative ring 2 covers the circular end surface 14, and covers the sliding groove 11, so that the watch has an integral appearance effect. The circular end surface 14 further performs a function of supporting the decorative ring 2.

Figure 4:
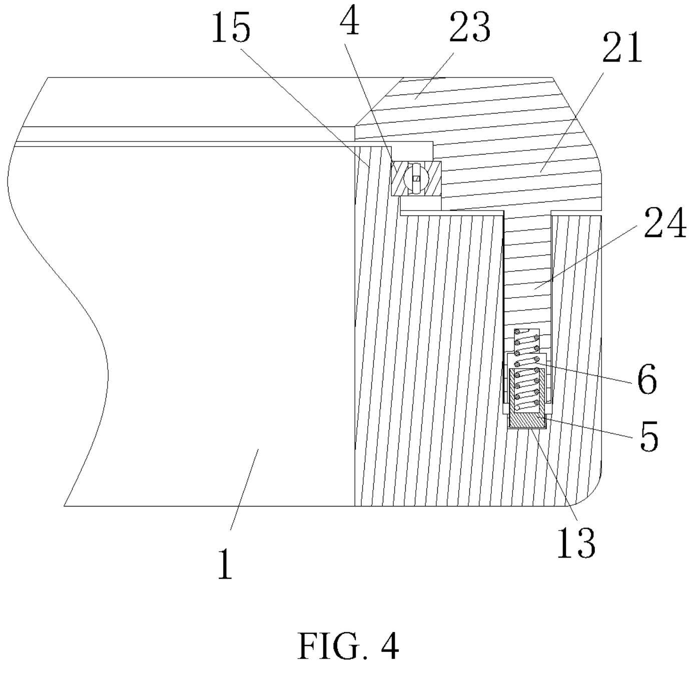
FIG. 4 is a longitudinally sectional view of another location of the watch in FIG. 1.

As shown in FIG. 3 and FIG. 4, the decorative ring 2 has a main ring body 21 and a turnup portion 23 that is bent inwards from an upper edge of the main ring body 21. The latch portion is disposed on the main ring body 21. The main ring body 21 is connected with the circular convex rib 15 through the bearing 4. The turnup portion 23 shields the bearing 4.

In this implementation, the bearing 4 is shielded by the turnup portion 23, so that the watch has an integral appearance effect, and an effect of protecting the bearing 4 is produced.

As shown in FIG. 1 and FIG. 2, the latch portion includes an arc-shaped plug-in shaft **22*a*; and the latch engagement portion includes a through groove 31 disposed on the watch strap 3. In a case that the decorative ring 2 is at the first location, the arc-shaped plug-in shaft 22*a* penetrates through the through groove 31. In a case that the decorative ring 2 is at the second location, the arc-shaped plug-in shaft 22*a* is withdrawn from the through groove 31**.

In this implementation, the latch engagement portion includes the through groove 31 disposed in a width direction of the watch strap 3. After the end of the watch strap 3 is inserted into the watch strap insertion opening 12, the through groove 31 is in the sliding groove 11. At this moment, rotation of the decorative ring 2 may drive the arc-shaped plug-in shaft **22*a* to be inserted into the sliding groove 11**.

The arc-shaped plug-in shaft **22*a* and the decorative ring 2 are disposed in parallel, with a clearance reserved therebetween. The latch portion further includes a connection block 24 that is connected with the decorative ring 2 and the arc-shaped plug-in shaft 22*a*. The connection block 24 can be inserted into the sliding groove 11, so that the arc-shaped plug-in shaft 22*a* and the latch engagement portion of the watch strap 3 are in a same plane. This facilitates plug-in engagement between the arc-shaped plug-in shaft 22*a* and the latch engagement portion. The connection block 24** is provided with a locking component. A specific structure of the locking component is described below in detail.

The middle frame 1 is provided with two watch strap insertion openings 12. The two watch strap insertion openings 12 are in two opposite sides of the middle frame 1. There are a first arc-shaped plug-in shaft and a second arc-shaped plug-in shaft. The first arc-shaped plug-in shaft and the second arc-shaped plug-in shaft are disposed on two opposite sides of the decorative ring 2. A length of the first arc-shaped plug-in shaft is different from that of the second arc-shaped plug-in shaft.

In this implementation, there are a first watch strap 3 and a second watch strap 3. Each of the two watch straps 3 is provided with a latch engagement portion. The two watch straps 3 are detachably connected with each other. The first arc-shaped plug-in shaft and the second arc-shaped plug-in shaft are respectively matched with the two watch strap insertion openings 12, and are configured to be plugged in the latch engagement portions (through grooves 31) on the two watch straps 3, respectively. The length of the first arc-shaped plug-in shaft is different from that of the second arc-shaped plug-in shaft, so that in a process of rotating the decorative ring 2, the first arc-shaped plug-in shaft and the second arc-shaped plug-in shaft are sequentially inserted into or withdrawn from the latch engagement portions of the first watch strap and the second watch strap. Therefore, the two watch straps 3 can be demounted from and mounted to the watch, sequentially. This helps the user remove the two watch straps 3.

Figure 5:
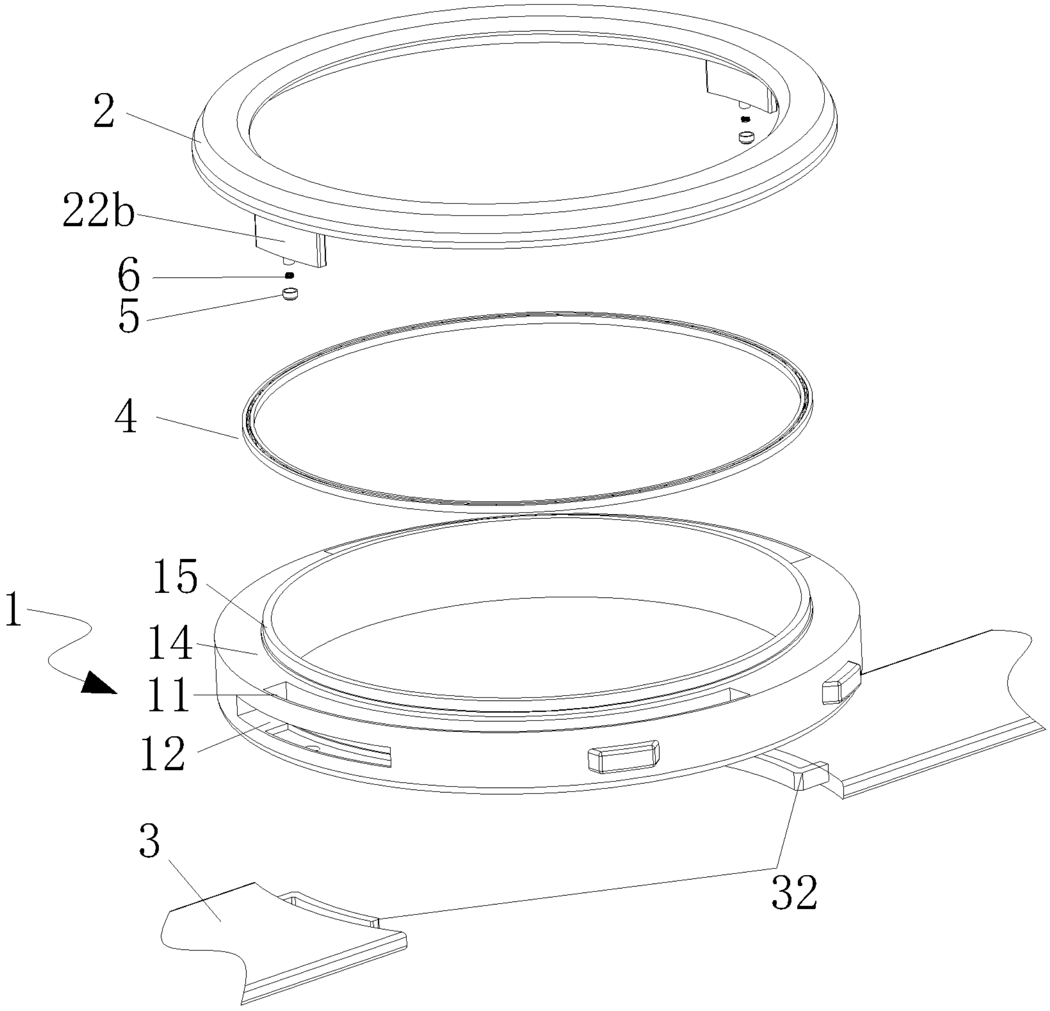
FIG. 5 is a schematic diagram of a second exploded structure of a watch according to an embodiment of this application.
Figure 6:
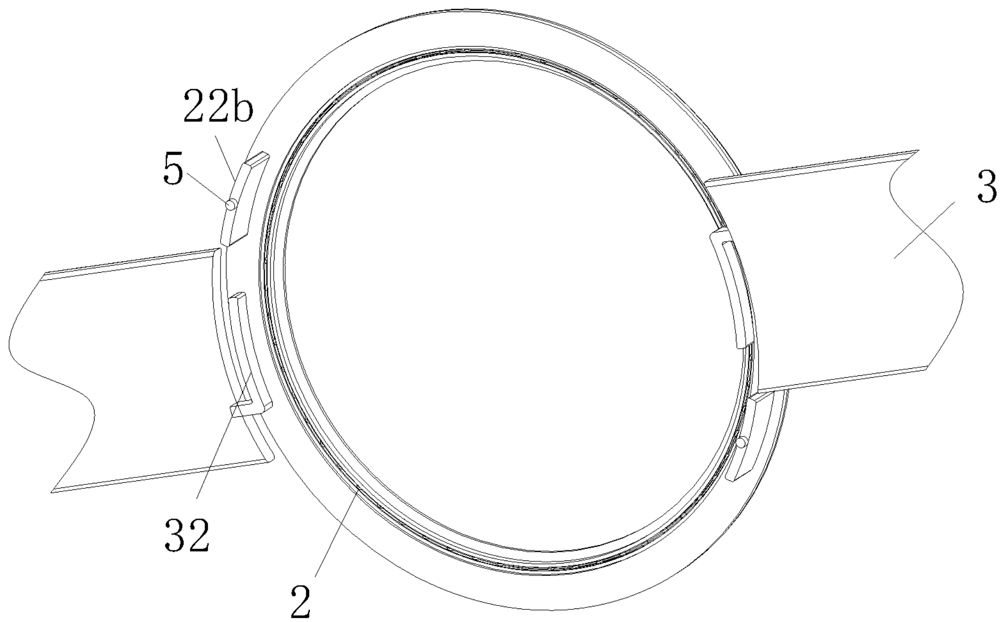
FIG. 6 is a schematic diagram of an engaged structure of a watch strap and a decorative ring that are in FIG. 5.
Figure 7:
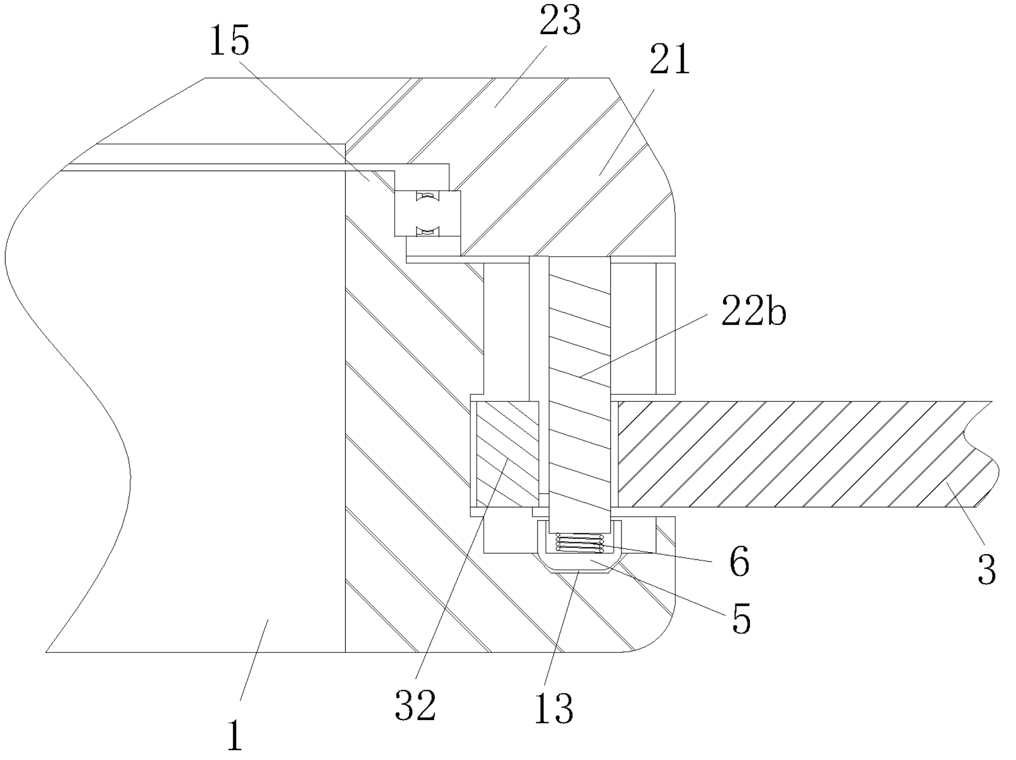
FIG. 7 is a longitudinally sectional view of the watch in FIG. 5.

As shown in FIG. 5, FIG. 6, and FIG. 7, the latch portion includes an arc-shaped block body **22*b*, and the latch engagement portion includes a hook 32; or the latch portion includes a hook 32, and the latch engagement portion includes an arc-shaped block body 22*b*. In a case that the decorative ring 2 is at the first location, the arc-shaped block body 22*b* is in the hook 32; or in a case that the decorative ring 2 is at the second location, the arc-shaped block body 22*b* is withdrawn from the hook 32**.

In this implementation, the following is used as an example: The latch portion includes the arc-shaped block body **22*b*, and the latch engagement portion includes the hook 32. The hook 32 includes a strip that extends in the width direction of the watch strap 3. The strip is arc-shaped. One end of the strip is provided with a connector that is connected with the strip and the watch strap 3. A clamping space is formed between the strip and the watch strap 3. In a process in which the user rotates the decorative ring 2, the decorative ring 2 drives the arc-shaped block body 22*b* to slide into the clamping space. The arc-shaped block body 22*b* is attached to the arc-shaped strip, so that mounting of the watch strap 3 is implemented. When the user rotates the decorative ring 2 in the reverse direction, the arc-shaped block body 22***b* may be driven to withdraw from the clamping space, so that demounting of the watch strap is implemented.

As shown in FIG. 4 and FIG. 7, the latch portion is provided with a locking component, and a bottom wall of the sliding groove 11 is provided with a locking recess portion 13. In a case that the decorative ring 2 is at the first location, the locking component is clamped into the locking recess portion 13 to limit rotation of the decorative ring 2.

In this implementation, in a case that the decorative ring 2 is at the first location, the latch portion is in plug-in engagement with the latch engagement portion; and the locking component is clamped into the locking recess portion 13 to lock a location of the latch portion, so that the latch portion and the latch engagement portion are kept in a plug-in engagement state.

The locking component includes a slider 5 and an elastic component 6 connected with the slider 5. The elastic component 6 is connected with the slider 5 and the latch portion. Under the action of the elastic component 6, the slider 5 is abutted against the bottom wall of the sliding groove 11. When the decorative ring 2 is rotated and drives the slider 5 to slide along the bottom wall of the sliding groove 11 to the locking recess portion 13, the slider 5 is embedded into the locking recess portion 13 under the action of elastic force of the elastic component 6, thereby locking a location of the latch portion. The locking recess portion 13 is provided with a guiding slope. When the decorative ring 2 is rotated in the reverse direction, and a specific force value is reached, the slider 5 is enabled to slide out of the locking recess portion 13, so that locking of the latch portion is released.

Figure 8:
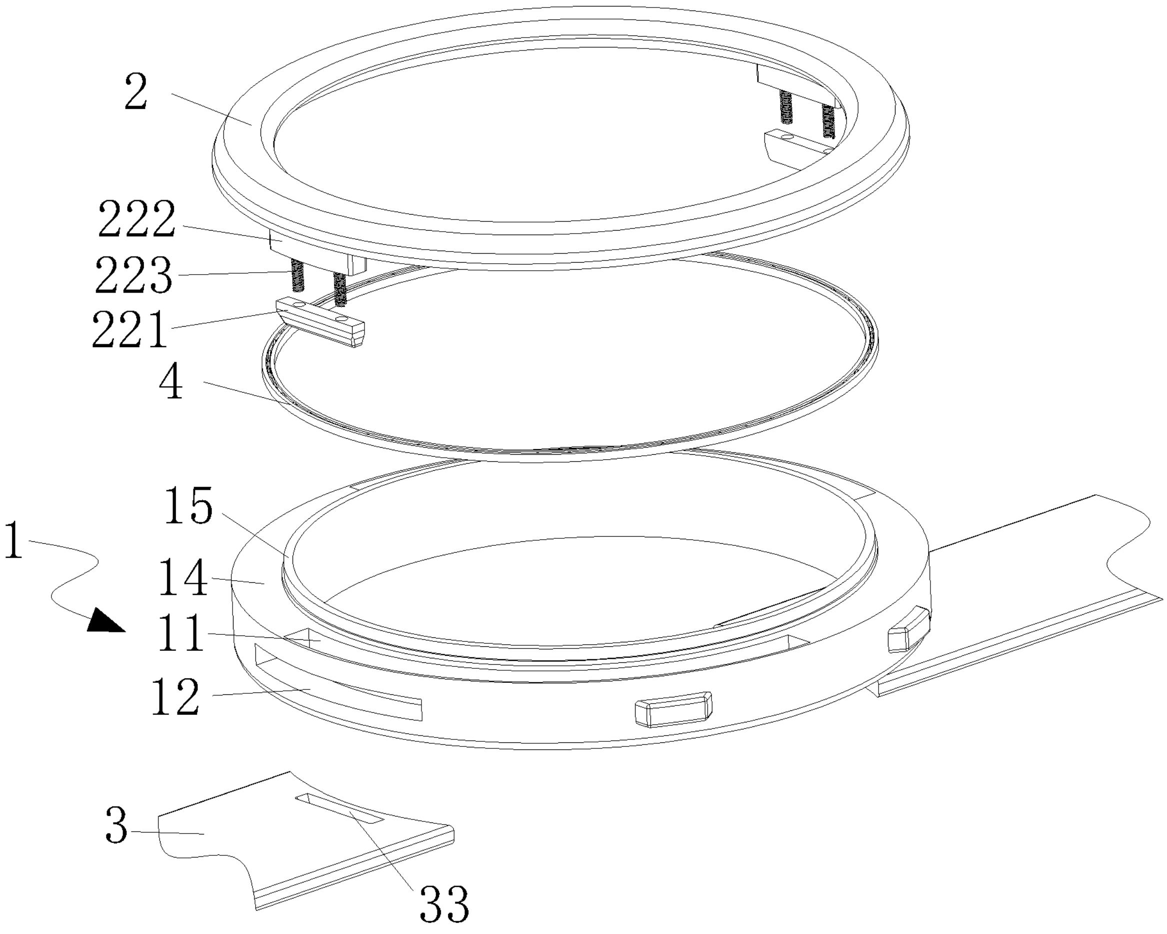
FIG. 8 is a schematic diagram of a third exploded structure of a watch according to an embodiment of this application.

As shown in FIG. 8, the latch portion is of an elastic structure; and the latch engagement portion includes a clamping groove 33 disposed on the watch strap 3. In a case that the decorative ring 2 is at the second location, the latch portion is abutted against the bottom wall of the sliding groove 11 in an elastically compressed manner. In a case that the decorative ring 2 is at the first location, deformation of the latch portion is recovered, and the latch portion is inserted into the clamping groove 33.

In this implementation, the latch portion is of an elastic structure; the end of the watch strap 3 is provided with the clamping groove 33; the watch strap 3 is inserted into the sliding groove 11 through the watch strap insertion opening 12; and at least the clamping groove 33 is in the sliding groove 11. In this case, rotation of the decorative ring 2 can drive the latch portion to slide along the sliding groove 11. When the latch portion slides to the clamping groove 33, the latch portion is elastically released and is inserted into the clamping groove 33, so that the watch strap 3 is locked directly. When the user continues rotating the decorative ring 2, obvious resistance is generated, so that the watch strap 3 is less prone to fall off. To demount the watch strap 3, the user rotates the decorative ring 2 in the reverse direction, so that the decorative ring 2 drives the latch portion to slide along a guiding slope on an edge of the clamping groove 33 on the watch strap 3; and the latch portion is elastically compressed and deformed, and finally slides out of the clamping groove 33. At this moment, the user can remove the watch strap 3.

The latch portion can be integrally or partially made of an elastic material. For example, the latch portion may be made of a rubber material. In some embodiments, as shown in FIG. 8, the latch portion includes an insertion block 221 and a lower extension portion 222 that is connected to the decorative ring 2; and the insertion block 221 is connected to the lower extension portion 222 through an elastic body 223. The lower extension portion 222 may be provided with a concave groove. The elastic body 223 may be a spring. The insertion block 221 is partially disposed in the concave groove, and is connected with the lower extension portion 222 through the spring. The insertion block 221 can slide up and down relative to the lower extension portion 222. To improve structural stability, the insertion block 221 and the lower extension portion 222 are connected with each other through two spaced springs. Therefore, in a process of inserting the insertion block 221 into the clamping groove 33, stress on the insertion block 221 is uniform, and inclination is avoided.

The embodiments of this application are described above with reference to the accompanying drawings. However, this application is not limited to the foregoing specific implementations. The foregoing specific implementations are merely illustrative instead of restrictive. Under the enlightenment of this application, a person of ordinary skill in the art may make many forms without departing from the essence of this application and the protection scope of the claims, all of which fall within the protection of this application.

The invention claimed is:

1. A watch, comprising a main body and a watch strap, wherein:

the main body comprises a middle frame and a decorative ring, the middle frame is provided with a sliding groove, an outer wall of the middle frame is provided with a watch strap insertion opening that is communicated with the sliding groove, the decorative ring is rotatably connected to the middle frame, the decorative ring is provided with a latch portion, and the latch portion extends into the sliding groove, wherein the latch portion comprises arc-shaped plug-in shafts including a first arc-shaped plug-in shaft and a second arc-shaped plug-in shaft disposed on two opposite sides of the decorative ring, and a length of the first arc-shaped plug-in shaft is different from that of the second arc-shaped plug-in shaft;

an end of the watch strap is provided with a latch engagement portion, and at least the latch engagement portion is configured to be inserted into the sliding groove through the watch strap insertion opening; and the decorative ring is movable between a first location and a second location relative to the middle frame, wherein when the decorative ring moves toward the first location, the latch portion moves within the sliding groove to be plugged in the latch engagement portion, and the watch strap is connected with the main body, and when the decorative ring moves toward the second location, the latch portion moves within the sliding groove to be separated from the latch engagement portion, and the watch strap is separatable from the main body.

2. The watch according to claim 1, wherein the middle frame is provided with an opening portion, an edge of the opening portion has a circular end surface, and the sliding groove is formed in the circular end surface;

a circular convex rib is disposed on a side, away from the watch strap insertion opening, of the circular end surface; and the decorative ring is connected with the circular convex rib through a bearing, and the decorative ring covers the sliding groove.

3. The watch according to claim 2, wherein the decorative ring has a main ring body and a turnup portion that is bent inwards from an upper edge of the main ring body;

the latch portion is disposed on the main ring body; and the main ring body is connected with the circular convex rib through the bearing, and the turnup portion shields the bearing.

4. The watch according to claim 1, wherein the latch engagement portion comprises through grooves; and when the decorative ring is at the first location, the arc-shaped plug-in shafts penetrate through the through grooves; or when the decorative ring is at the second location, the arc-shaped plug-in shafts are withdrawn from the through grooves.

5. The watch according to claim 4, wherein the middle frame is provided with two watch strap insertion openings; and the two watch strap insertion openings are in two opposite sides of the middle frame.

6. The watch according to claim 1, wherein the latch portion comprises an arc-shaped block body, and the latch engagement portion comprises a hook; or the latch portion comprises a hook, and the latch engagement portion comprises an arc-shaped block body; and when the decorative ring is at the first location, the arc-shaped block body is in the hook; or when the decorative ring is at the second location, the arc-shaped block body is withdrawn from the hook.

7. The watch according to claim 1, wherein the latch portion is provided with a locking component, and a bottom wall of the sliding groove is provided with a locking recess portion; and when the decorative ring is at the first location, the locking component is clamped into the locking recess portion to limit rotation of the decorative ring.

8. The watch according to claim 7, wherein the locking component comprises a slider and an elastic component, and the elastic component is connected with the slider and the latch portion; and under the action of the elastic component, the slider is abutted against the bottom wall of the sliding groove.

9. The watch according to claim 1, wherein the latch portion is of an elastic structure, and the latch engagement portion comprises a clamping groove disposed on the watch strap; and when the decorative ring is at the second location, the latch portion is abutted against a bottom wall of the sliding groove in an elastically compressed manner; or when the decorative ring is at the first location, deformation of the latch portion is recovered, and the latch portion is inserted into the clamping groove.

10. The watch according to claim 9, wherein the latch portion comprises an insertion block and a lower extension portion that is connected with the decorative ring, and the insertion block is connected with the lower extension portion through an elastic body.

* * * * *